United States Patent [19]
Miller et al.

[11] Patent Number: 5,845,428
[45] Date of Patent: Dec. 8, 1998

[54] BUTANE FISHING ROD HANDLE WARMER

[76] Inventors: Larry S. Miller, 5783 Slater Rd. West, Williamsfield, Ohio 44093; Steven P. Pawlowski, 6675 Bazetta Rd., Cortland, Ohio 44410

[21] Appl. No.: 4,081

[22] Filed: Jan. 8, 1998

[51] Int. Cl.$^6$ .................................................. A01K 87/00
[52] U.S. Cl. ................................................ 43/18.1; 43/23
[58] Field of Search ...................... 43/18.1, 23; 126/204, 126/206, 208

[56] References Cited

U.S. PATENT DOCUMENTS

| | | | |
|---|---|---|---|
| 3,858,567 | 1/1975 | Slogaski | 43/23 |
| 4,020,825 | 5/1977 | Fusetti | 126/206 |
| 4,584,787 | 4/1986 | Aho | 43/23 |
| 4,598,192 | 7/1986 | Garrett | 126/204 |
| 5,517,786 | 5/1996 | Peissig | 43/18.1 |

*Primary Examiner*—Thomas Price

[57] ABSTRACT

A heated fishing rod handle is provided including a heater assembly including a fluidic fuel outlet tube situated within the handle and being in communication with a fuel container removably stored in the handle. The heater assembly further includes a spark generating mechanism for generating a spark upon the actuation thereof. Further included is a heater control assembly including a fuel dispensing lever extending from the handle for selectively controlling the output of fuel from the fuel outlet tube. A push button is situated on the handle for actuating the spark generating mechanism upon being depressed thereby igniting the fuel and generating heat which exudes from the handle.

8 Claims, 2 Drawing Sheets

BUTANE FISHING ROD HANDLE WARMER

BACKGROUND OF THE INVENTION

1. Field of the Invention

The present invention relates to fishing rod handle warmers and more particularly pertains to a new butane fishing rod handle warmer for warming hands of a user while fishing.

2. Description of the Prior Art

The use of fishing rod handle warmers is known in the prior art. More specifically, fishing rod handle warmers heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing rod handle warmers include U.S. Pat. No. 4,646,461; U.S. Pat. No. 4,584,787; U.S. Pat. No. 4,589,192; U.S. Pat. No. 5,175,953; U.S. Pat. No. 4,020,825; and U.S. Pat. No. Des. 354,112.

In these respects, the butane fishing rod handle warmer according to the present invention substantially departs from the conventional concepts and designs of the prior art, and in so doing provides an apparatus primarily developed for the purpose of warming hands of a user while fishing.

SUMMARY OF THE INVENTION

In view of the foregoing disadvantages inherent in the known types of fishing rod handle warmers now present in the prior art, the present invention provides a new butane fishing rod handle warmer construction wherein the same can be utilized for warming hands of a user while fishing.

The general purpose of the present invention, which will be described subsequently in greater detail, is to provide a new butane fishing rod handle warmer apparatus and method which has many of the advantages of the fishing rod handle warmers mentioned heretofore and many novel features that result in a new butane fishing rod handle warmer which is not anticipated, rendered obvious, suggested, or even implied by any of the prior art fishing rod handle warmers, either alone or in any combination thereof.

To attain this, the present invention generally comprises an outboard extent with a cylindrical configuration having a predetermined diameter. The outboard extent has a soft outer surface and a hollow inboard end with a threaded inner periphery. Further provided is an intermediate extent constructed from a conductive metallic material and equipped with a hollow cylindrical configuration having the predetermined diameter. The intermediate extent has a plurality of sets of circular apertures formed therein. As shown in FIG. 1, each set of circular apertures remains within a unique corresponding plane situated in perpendicular relationship with an axis of the handle. The intermediate extent further includes an outboard end with a cylindrical lip having a threaded exterior periphery. During use, the cylindrical lip is removably coupled to the inboard end of the outboard extent. The intermediate extent further has a hollow inboard end with a threaded inner periphery. A pair of brackets are removably coupled to the intermediate extent for mounting a reel thereto which depends downwardly therefrom. Also included is an inboard extent with a hollow cylindrical configuration having the predetermined diameter. As shown in FIG. 1, the inboard extent includes an outboard end with a cylindrical lip having a threaded exterior periphery. The cylindrical lip of the inboard extent is removably coupled to the inboard end of the intermediate extent. For releasably receiving a replaceable cylindrical butane fuel container, the inboard extent has a open inboard end. Removably secured to the inboard end is an end cap. Note FIG. 2. With reference in particular to FIG. 1, a heater assembly includes a small fuel outlet tube extended from the outboard end of the inboard extent in concentric relationship therewith. Such outlet tube is equipped with a length equal to half that of the intermediate extent. In operation, the fuel outlet tube remains in communication with the butane fuel container. Situated adjacent to an end of the fuel outlet tube is a pair of spark elements. The spark elements are adapted for generating a spark thereat upon the actuation thereof. A heater cover is provided with a cylindrical configuration having a diameter less than the predetermined diameter and a length approximately equal to that of the intermediate extent. The heater cover has an open inboard end for removably receiving the heater assembly and releasably securing to the outboard end of the inboard extent. Lastly, a heater control assembly includes a fuel dispensing lever extending radially from a side of the outboard end of the inboard extent. The fuel dispensing lever is rotatable about the axis of the handle for selectively controlling the output of butane from the fuel outlet tube. Associated therewith is a push button situated on a top of the inboard extent for actuating the spark elements upon being depressed. This ignites the butane fuel and generates heat which exudes from the apertures of the heater cover and intermediate extent.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new butane fishing rod handle warmer apparatus and method which has many of the advantages of the fishing rod handle warmers mentioned heretofore and many novel features that result in a new butane fishing rod handle warmer which is not anticipated, rendered obvious, suggested, or even implied by any of the prior art fishing rod handle warmers, either alone or in any combination thereof.

It is another object of the present invention to provide a new butane fishing rod handle warmer which may be easily and efficiently manufactured and marketed.

It is a further object of the present invention to provide a new butane fishing rod handle warmer which is of a durable and reliable construction.

An even further object of the present invention is to provide a new butane fishing rod handle warmer which is susceptible of a low cost of manufacture with regard to both materials and labor, and which accordingly is then susceptible of low prices of sale to the consuming public, thereby making such butane fishing rod handle warmer economically available to the buying public.

Still yet another object of the present invention is to provide a new butane fishing rod handle warmer which provides in the apparatuses and methods of the prior art some of the advantages thereof, while simultaneously overcoming some of the disadvantages normally associated therewith.

Still another object of the present invention is to provide a new butane fishing rod handle warmer for warming hands of a user while fishing.

Even still another object of the present invention is to provide a new butane fishing rod handle warmer that includes a heater assembly including a fluidic fuel outlet tube situated within the handle and being in communication with a fuel container removably stored in the handle. The heater assembly further includes a spark generating mechanism for generating a spark upon the actuation thereof. Further included is a heater control assembly including a fuel dispensing lever extending from the handle for selectively controlling the output of fuel from the fuel outlet tube. A push button is situated on the handle for actuating the spark generating mechanism upon being depressed thereby igniting the fuel and generating heat which exudes from the handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
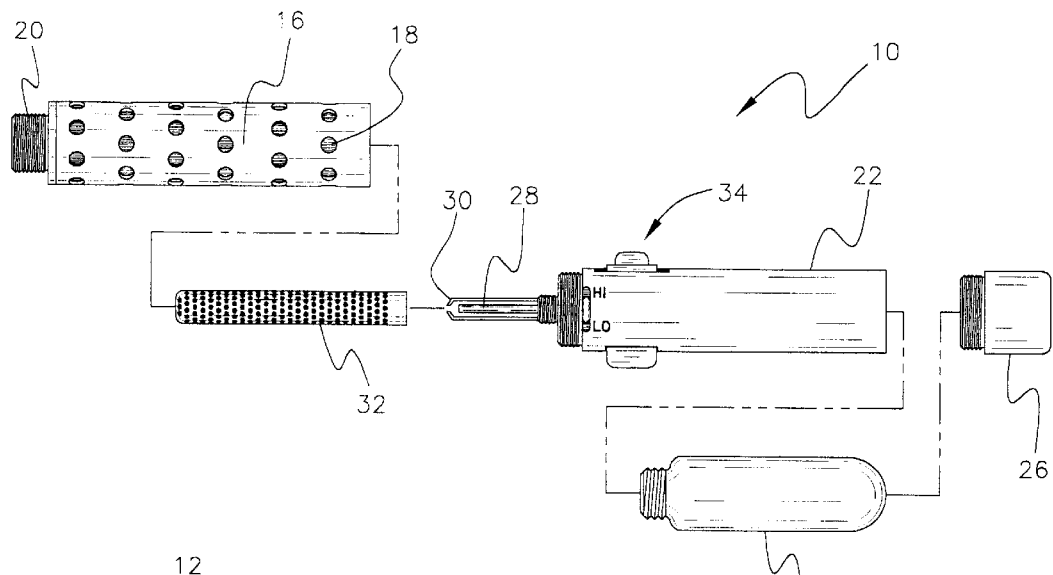
FIG. 1 is an exploded view of a new butane fishing rod handle warmer according to the present invention.
Figure 2:
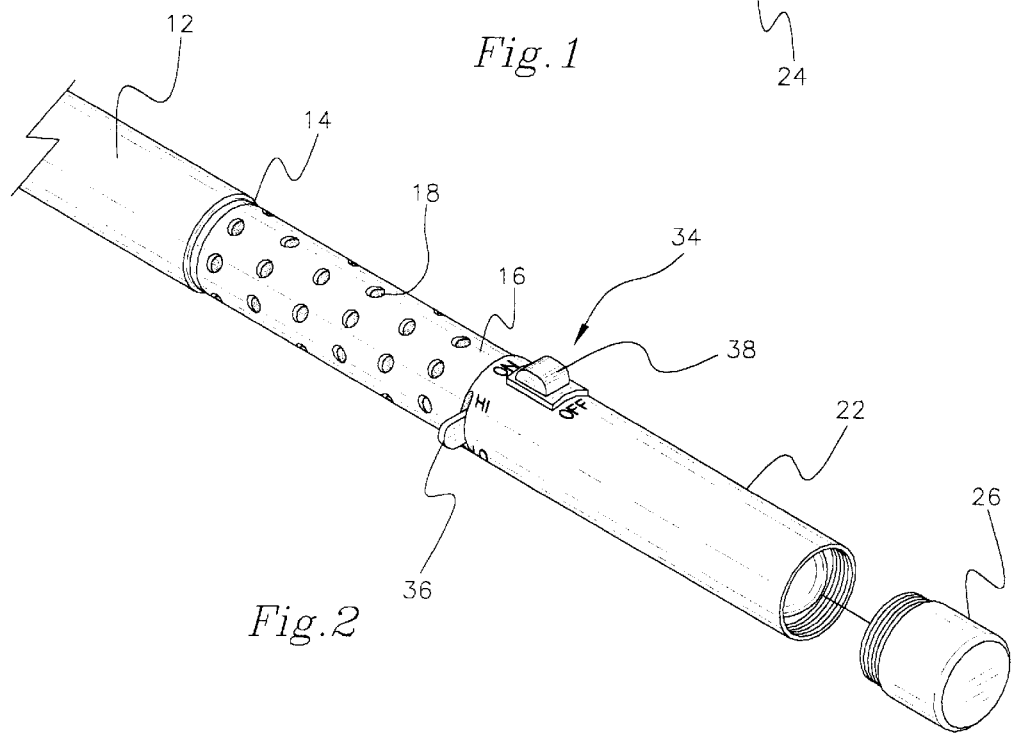
FIG. 2 is a perspective view of the present invention with each of the extents assembled.
Figure 3:
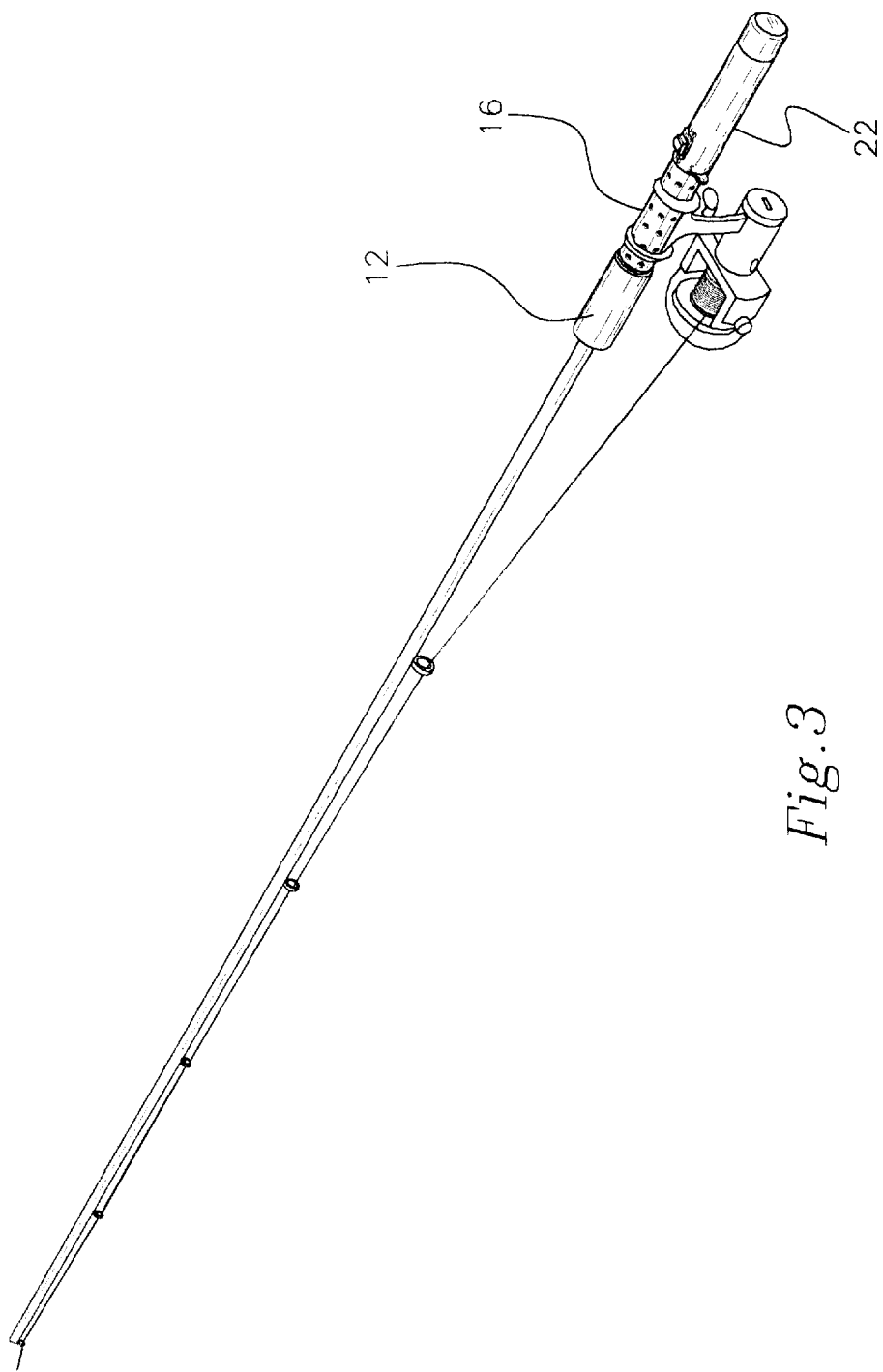
FIG. 3 is a perspective view of the present invention.

With reference now to the drawings, and in particular to FIGS. 1 through 3 thereof, a new butane fishing rod handle warmer embodying the principles and concepts of the present invention and generally designated by the reference numeral 10 will be described.

The present invention, designated as numeral 10, includes an outboard extent 12 with a cylindrical configuration having a predetermined diameter. A hollow inboard end 14 of the outboard extent is equipped with a threaded inner periphery. As an option, the outboard extent may have a soft outer surface.

Further provided is an intermediate extent 16 constructed from a conductive metallic material and equipped with a hollow cylindrical configuration having the predetermined diameter. The intermediate extent has a smooth outer surface with the exception of a plurality of sets of circular apertures 18 formed along an entire length thereof. As shown in FIG. 1, each set of circular apertures remains within a unique corresponding plane situated in perpendicular relationship with an axis of the handle.

The intermediate extent further includes an outboard end with a cylindrical lip 20 having a threaded exterior periphery. During use, the cylindrical lip is removably coupled to the inboard end of the outboard extent. The intermediate extent further has a hollow inboard end with a threaded inner periphery. A pair of brackets are removably coupled to the intermediate extent for mounting a reel thereto which depends downwardly therefrom.

Also included is an inboard extent 22 with a hollow cylindrical configuration having the predetermined diameter. In comparison, the inboard extent and intermediate extent each have a common length which is greater than that of the outboard extent. As shown in FIG. 1, the inboard extent includes an outboard end with a cylindrical lip having a threaded exterior periphery. The cylindrical lip of the inboard extent is removably coupled to the inboard end of the intermediate extent. For releasably receiving a replaceable cylindrical butane fuel container 24, the inboard extent has a open inboard end and compartment. Screwably secured to the inboard end is an end cap 26. Note FIG. 2.

With reference in particular to FIG. 1, a heater assembly includes a small fuel outlet tube 28 extended from the outboard end of the inboard extent in concentric relationship therewith. Such outlet tube is equipped with a length equal to half that of the intermediate extent. In operation, the fuel outlet tube remains in communication with the butane fuel container. Situated adjacent to an end of the fuel outlet tube is a pair of spark elements 30. The spark elements are adapted for generating a spark thereat upon the actuation thereof.

A heater cover 32 is provided with a cylindrical configuration having a diameter less than the predetermined diameter and a length approximately equal to that of the intermediate extent. The heater cover has an open inboard end for removably receiving the heater assembly and releasably securing to the outboard end of the inboard extent. Such releasable coupling is preferably accomplished via a method similar to the interconnection of the various extents of the present invention. As will become apparent, the cover functions to prevent a user from being burned and further protects a flame therein from extinguishing. As an option, each of the apertures of the intermediate extent may be lined with a screen to further accomplish the foregoing objective.

Lastly, a heater control assembly 34 includes a fuel dispensing lever 36 extending radially from a side of the outboard end of the inboard extent. The fuel dispensing lever is rotatable about the axis of the handle for selectively controlling the output of butane from the fuel outlet tube.

This may be accomplished by way of a rotating valve connected to the outlet tube and further coupled to the lever. It is preferred that yet another switch be dedicated to solely cutting off the fuel from the fuel outlet tube.

Associated therewith is a push button 38 situated on a top of the inboard extent for actuating the spark elements upon being depressed. This ignites the butane fuel and generates heat which exudes from the apertures of the heater cover and intermediate extent.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A heated fishing rod handle comprising, in combination:

an outboard extent with a cylindrical configuration having a predetermined diameter, the outboard extent having a soft outer surface and a hollow inboard end with a threaded inner periphery;

an intermediate extent constructed from a conductive metallic material and equipped with a hollow cylindrical configuration having the predetermined diameter, the intermediate extent having a plurality of sets of circular apertures formed therein with each set of circular apertures remaining within a unique corresponding plane situated in perpendicular relationship with an axis of the handle, the intermediate extent including an outboard end with a cylindrical lip having a threaded exterior periphery, the cylindrical lip removably coupled to the inboard end of the outboard extent, the intermediate extent further having a hollow inboard end with a threaded inner periphery, wherein a pair of brackets are removably coupled to the intermediate extent for mounting a reel thereto which depends downwardly therefrom;

an inboard extent with a hollow cylindrical configuration having the predetermined diameter, the inboard extent including an outboard end with a cylindrical lip having a threaded exterior periphery, the cylindrical lip of the inboard extent removably coupled to the inboard end of the intermediate extent, the inboard extent having a open inboard end releasably receiving a replaceable cylindrical butane fuel container, wherein an end cap is removably secured to the inboard end;

a heater assembly including a small fuel outlet tube extended from the outboard end of the inboard extent in concentric relationship therewith and with a length equal to half that of the intermediate extent, the fuel outlet tube being in communication with the butane fuel container, the heater assembly further including a pair of spark elements situated adjacent to an end of the fuel outlet tube for generating a spark thereat upon the actuation thereof;

a heater cover with a cylindrical configuration having a diameter less than the predetermined diameter and a length approximately equal to that of the intermediate extent, the heater cover having an open inboard end for removably receiving the heater assembly and releasably securing to the outboard end of the inboard extent; and a heater control assembly including a fuel dispensing lever extending radially from a side of the outboard end of the inboard extent and rotatably about the axis of the handle for selectively controlling the output of butane from the fuel outlet tube, the heater control assembly further including a push button situated on a top of the inboard extent for actuating the spark elements upon being depressed thereby igniting the butane fuel and generating heat which exudes from the apertures of the heater cover and intermediate extent.

2. A heated fishing rod handle comprising:

a heater assembly including a fluidic fuel outlet tube situated within the handle and being in communication with a fuel container removably stored in the handle, the heater assembly further including a spark generating means for generating a spark thereat upon the actuation thereof; and a heater control assembly including a fuel dispensing means for selectively controlling the output of fuel from the fuel outlet tube, the heater control assembly further including a push button situated on the handle for actuating the spark generating means upon being depressed thereby igniting the fuel and generating heat which exudes from the handle.

3. A heated fishing rod handle as set forth in claim 2 wherein a plurality of apertures are formed in the handle from which the heat exudes.

4. A heated fishing rod handle as set forth in claim 3 wherein a heater cover with a plurality of apertures is mounted over the fuel outlet tube and is situated within the handle.

5. A heated fishing rod handle as set forth in claim 3 wherein the apertures are formed on an extent of the handle to which a reel is coupled and depends therefrom.

6. A heated fishing rod handle as set forth in claim 3 wherein the heater control assembly is situated inboardly of the apertures.

7. A heated fishing rod handle as set forth in claim 2 wherein the handle has a removable end cap for allowing selective access to the fuel container.

8. A heated fishing rod handle as set forth in claim 2 wherein the fuel is butane.

* * * * *